US012683900B2

(12) United States Patent
Abbas et al.

(10) Patent No.: US 12,683,900 B2
(45) Date of Patent: Jul. 14, 2026

(54) SYSTEMS AND METHODS FOR NETWORK TRAFFIC SHAPING FOR STREAMING AND DOWNLOADABLE VIDEO

(71) Applicant: VERIZON PATENT AND LICENSING INC., Basking Ridge, NJ (US)

(72) Inventors: Khurram Abbas, Novi, MI (US); Krzysztof Pawlikowski, Farmington, CT (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 14 days.

(21) Appl. No.: 18/780,880

(22) Filed: Jul. 23, 2024

(65) Prior Publication Data

US 2026/0032087 A1     Jan. 29, 2026

(51) Int. Cl.
| | |
|---|---|
| *H04L 47/22* | (2022.01) |
| *G06N 3/0464* | (2023.01) |
| *H04L 41/16* | (2022.01) |
| *H04W 28/08* | (2023.01) |

(52) U.S. Cl.
CPC ........... *H04L 47/22* (2013.01); *G06N 3/0464* (2023.01); *H04L 41/16* (2013.01); *H04W 28/0983* (2020.05)

(58) Field of Classification Search
CPC ....... H04L 47/22; H04L 41/16; G06N 3/0464; H04W 28/0983
See application file for complete search history.

(56) References Cited

U.S. PATENT DOCUMENTS

| | | | |
|---|---|---|---|
| 11,240,544 B1 * | 2/2022 | Vaidberg | H04L 65/612 |
| 12,248,473 B1 * | 3/2025 | Liu | G06F 16/24545 |
| 2022/0180246 A1 * | 6/2022 | Mondal | G06N 20/00 |
| 2023/0323760 A1 * | 10/2023 | Al Ghaithi | E21B 43/26 |
| | | | 703/7 |
| 2024/0070603 A1 * | 2/2024 | Putrevu | G06Q 10/08355 |
| 2024/0402689 A1 * | 12/2024 | Itkis | G06N 20/00 |

FOREIGN PATENT DOCUMENTS

| | | | | |
|---|---|---|---|---|
| EP | 4141762 A1 * | 3/2023 | ........ | G06Q 10/0838 |
| WO | WO-2023164164 A1 * | 8/2023 | .......... | G06V 10/764 |

* cited by examiner

*Primary Examiner* — Philip C Lee

(57) ABSTRACT

Disclosed are systems and methods that provide a computerized framework for network traffic shaping and optimization using a novel, trained machine learning (ML) algorithm. The disclosure provides for the designed framework to enhance the efficiency and quality of data transmission over a network by dynamically determining the appropriate delivery method—streaming or downloading—for various types of content. The disclosed framework can execute a trained ML algorithm that analyzes real-time network conditions and content characteristics, and the like, to make such determinations as to how to deliver content to users, for which content is then provided to requesting content provider applications executing on user devices.

16 Claims, 7 Drawing Sheets

<u>500</u>

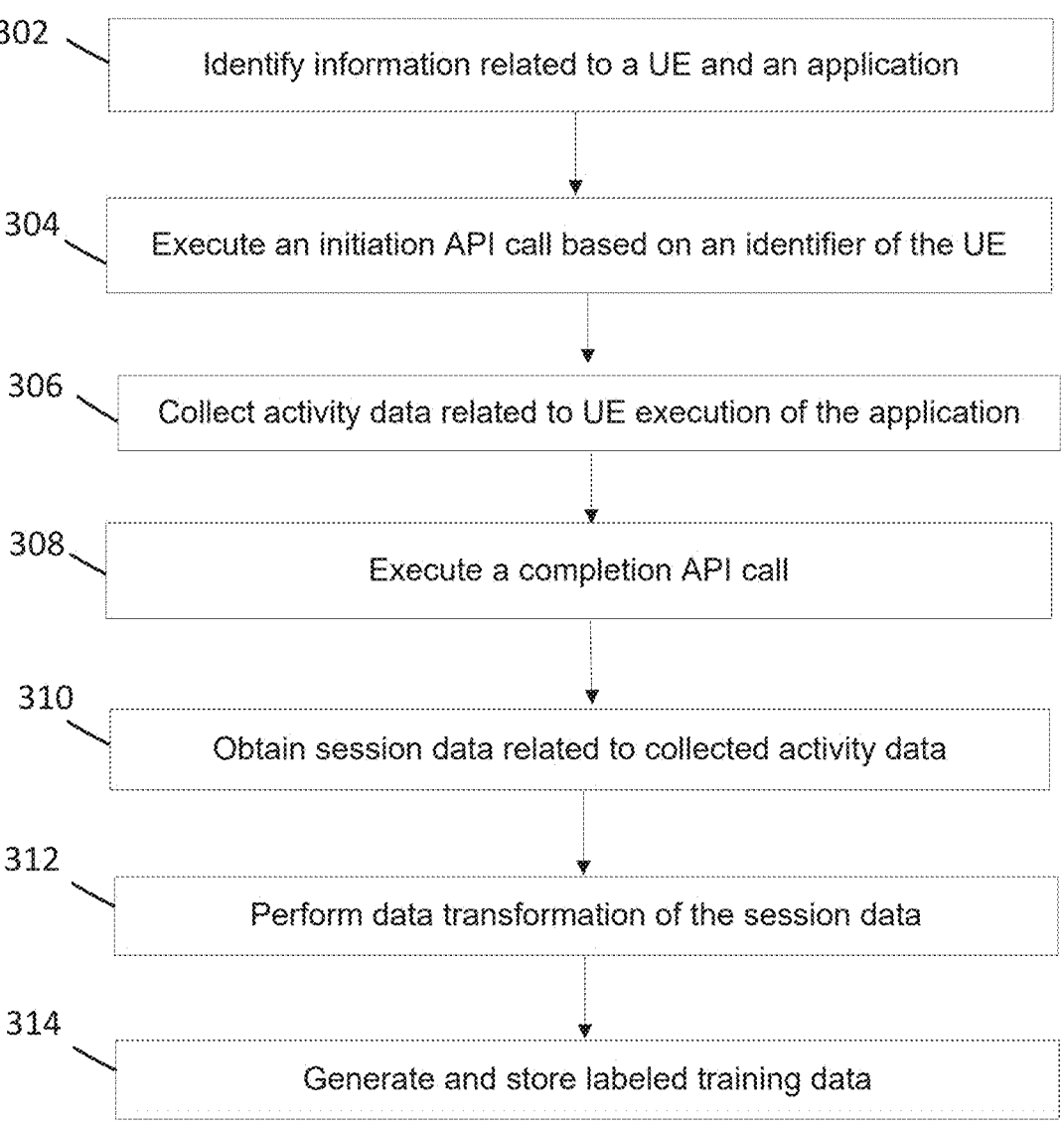

300

302 — Identify information related to a UE and an application

304 — Execute an initiation API call based on an identifier of the UE

306 — Collect activity data related to UE execution of the application

308 — Execute a completion API call

310 — Obtain session data related to collected activity data

312 — Perform data transformation of the session data

314 — Generate and store labeled training data

FIG. 3

402 — Receive a request to train a machine learning (ML) model

404 — Retrieve labeled training data

406 — Train the ML based at least on the retrieved labeled training data

408 — Determine whether results from training operation(s) are viable yes no

410 — Save ML model

400

500

502 — Receive request from UE to access video content

504 — Analyze information related to the request via execution of a saved ML model 506 — Determine a network traffic shaping operation responsive to the request 508 — Execute the network traffic shaping operation 510 — Cause access to the video content via the executed network traffic shaping operation

SYSTEMS AND METHODS FOR NETWORK TRAFFIC SHAPING FOR STREAMING AND DOWNLOADABLE VIDEO

BACKGROUND INFORMATION

Network traffic shaping is a technique used to control and optimize the flow of data across a network. Traffic shaping, also known as packet shaping, is a bandwidth management technique that can prioritize how packets are delivered to applications.

BRIEF DESCRIPTION OF THE DRAWINGS

The features and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

FIG. 3 illustrates an exemplary workflow according to some embodiments of the present disclosure;

DETAILED DESCRIPTION OF EXAMPLE EMBODIMENTS

Figure 1:
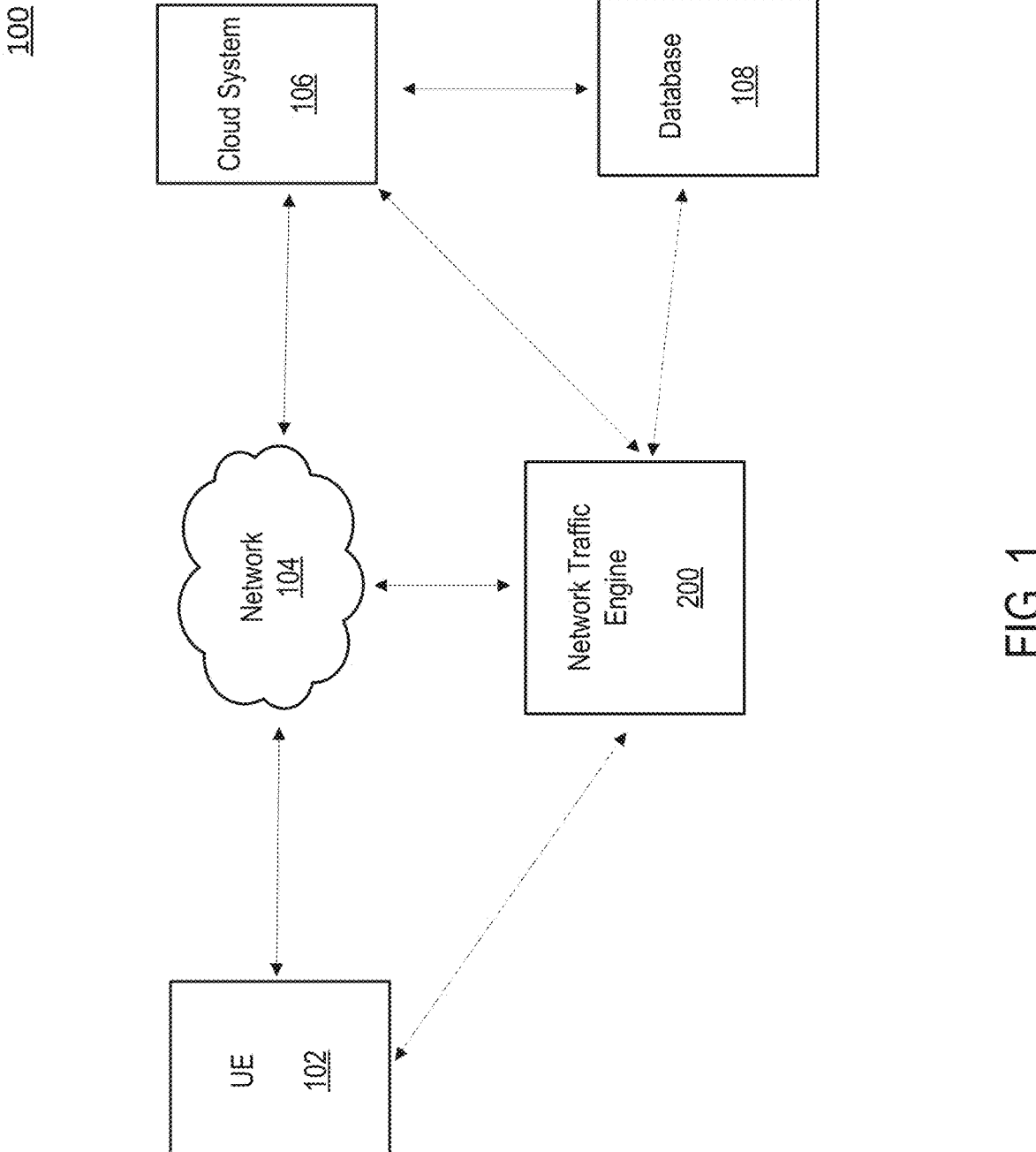
FIG. 1 is a block diagram of an example network architecture according to some embodiments of the present disclosure.

Network traffic shaping mechanisms can involve prioritizing certain types of traffic, limiting bandwidth for specific applications or users, and smoothing out traffic bursts to ensure consistent performance. Traffic shaping operations are designed to provide improved network efficiency and quality of service (QOS), among other benefits.

Wireless carriers can execute such traffic shaping operations to preserve the collection of radio frequencies available for transmission (e.g., referred to as the "wireless spectrum"). One technique, for example, is "video shaping" where such carriers can intercept, identify and apply a token-based shaping (e.g., bit rate throttling) to streaming videos. Based on this operation, a content provider can then apply Adaptive Bit Rate (ABR) techniques to the video stream that adjusts the video resolution based on the network conditions and bandwidth. Such ABR mechanisms are directed to ensuring that the video playback is uninterrupted. Moreover, such mechanisms are built on the premise that it is deemed better to serve the customers a lower bit rate video that plays back uninterrupted versus a higher bit rate video that constantly buffers.

Content providers offer capabilities for subscribers to download content to their device for offline viewing. The offline download capability differs from online streaming cases in a few ways. For example, offline downloads are not impacted by playback buffering issues given the entire video stream must be downloaded prior to playback, and users usually have a time restriction on how long they would wait for an offline download to complete. Content providers therefore engineer their applications to deliver both streaming and offline download content.

Wireless carriers can apply video shaping techniques to such content provider applications by inspecting the network traffic flows. However, with conventional mechanisms, looking at network flows and utilizing deterministic techniques (e.g., inspecting the Server Name Identifier (SNI), Endpoint Internet Protocols (IPs), content delivery networks (CDNs), and the like), may not be computationally sufficient to accurately and efficiently categorize an offline download versus a streaming video flow.

Thus, for example, not properly identifying streaming versus download content can result in the download video content being improperly shaped, resulting in a poor customer experience. For example, the bit rates at which streaming video content shaped are low; however, if/when applied to downloads, this can cause extended durations for downloading offline content for playback. The end user experience for offline video downloads would be poor, with users waiting long periods of time (e.g., many minutes or hours for a video to download instead of seconds).

For non-video offline content in streaming video applications, this would result in a large delay especially if the content (e.g., a filter lens pack update) is required for the application to function.

Conventional mechanisms to address such technical shortcomings utilize human generated heuristics, which are difficult to implement and even more difficult to maintain due to the vast number of applications and varying permutations of heuristics that are required. Accordingly, the disclosed systems and methods provide a novel framework that trains and implements a curated machine learning (ML) approach that is capable of handling a vast number of combinations of signatures to detect online versus offline streaming, which can be executed at a per application basis. In some embodiments, for example, the disclosed framework can deploy technical functionality that can include feature extraction methods combined with raw binary network data giving proper information to accurately and efficiently categorize the network flow pursuant to content delivery to end-user devices.

With reference to FIG. 1, system 100 is depicted which includes user equipment (UE) 102, network 104, cloud system 106, database 108, and network traffic engine 200. It should be understood that while system 100 is depicted as including such components, it should not be construed as limiting, as one of ordinary skill in the art would readily understand that varying numbers of UEs, engines, cloud systems, databases and networks can be utilized; however, for purposes of explanation, system 100 is discussed in relation to the example depiction in FIG. 1.

According to some embodiments, UE 102 can be any type of network device, as discussed above. In some embodiments, for example, UE 102 can include, but not be limited to, a mobile phone, tablet, laptop, game console, smart television (TV), Internet of Things (IOT) device, wearable device, an autonomous vehicle (AV), autonomous machine, unmanned aerial vehicle (UAV), and/or any other device equipped with a cellular or wireless or wired transceiver.

In some embodiments, network 104 can be any type of network, such as, but not limited to, a wireless network, cellular network, the Internet, and the like (as discussed above). Network 104 facilitates connectivity of the components of system 100, as illustrated in FIG. 1. Further discussion of embodiments of network 104 are provided below with reference to FIG. 6.

According to some embodiments, cloud system 106 may be any type of cloud operating platform and/or network-based system upon which applications, operations, and/or other forms of network resources may be located. For example, system 106 may be a service provider and/or network provider from where services and/or applications may be accessed, sourced or executed from. For example, system 106 can represent the cloud-based architecture associated with a cellular provider, which has associated network resources hosted on the internet or private network (e.g., network 104), which enables (via engine 200) the location determination operations discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE 102 and the services and applications provided by cloud system 106 and/or engine 200).

In some embodiments, for example, cloud system 106 can provide a private/proprietary management platform, whereby network traffic engine 200, discussed infra, corresponds to the novel functionality system 106 enables, hosts and provides to a network 104 and other devices/platforms operating thereon.

According to some embodiments, database 108 may correspond to a data storage for a platform (e.g., a network hosted platform, such as cloud system 106, as discussed supra) or a plurality of platforms. Database 108 may receive storage instructions/requests from, for example, network traffic engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

Network traffic engine 200, as discussed above and further below in more detail, can include components for the disclosed functionality. According to some embodiments, network traffic engine 200 may be a special purpose machine or processor, and can be hosted by a device (or component) on network 104, within cloud system 106 and/or on UE 102. In some embodiments, network traffic engine 200 may be hosted by a server and/or set of servers associated with cloud system 106.

According to some embodiments, network traffic engine 200 may be configured to implement and/or control a plurality of services and/or microservices, where each of the plurality of services/microservices are configured to execute a plurality of workflows associated with performing the disclosed connection management. Non-limiting embodiments of such workflows are provided below.

According to some embodiments, network traffic engine 200 may function as an application provided by and/or hosted by cloud system 106. In some embodiments, network traffic engine 200 may function as an application installed on a server(s), network location and/or other type of network resource associated with system 106. In some embodiments, such application may be a web-based application accessed by UE 102. In some embodiments, network traffic engine 200 may be configured and/or installed as an augmenting script, program or application (e.g., a plug-in or extension) to another application or program provided by cloud system 106 and/or executing on UE 102.

Figure 2:
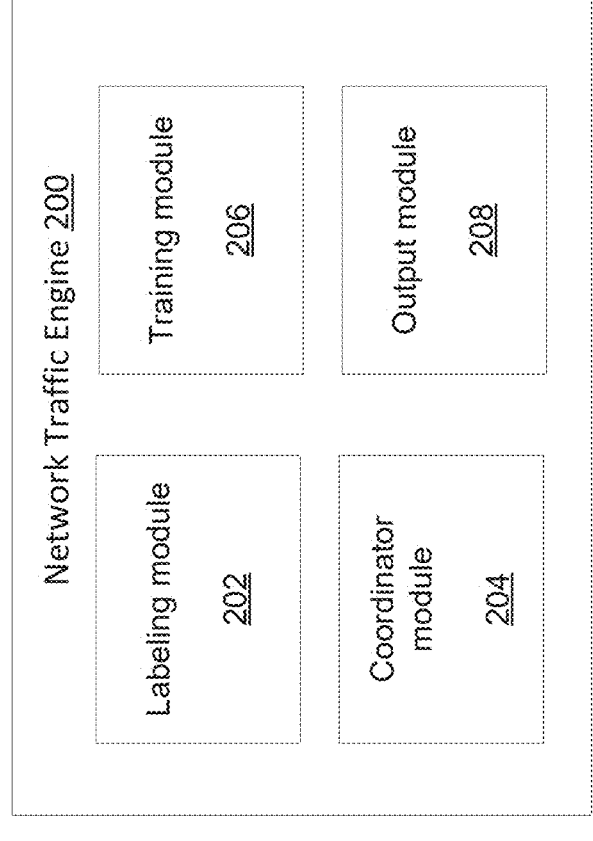
FIG. 2 is a block diagram illustrating components of an exemplary system according to some embodiments of the present disclosure.

As illustrated in FIG. 2, according to some embodiments, network traffic engine 200 includes labelling module 202, coordinator module 204, training module 206 and output module 208. It should be understood that the modules discussed herein are non-exhaustive, as additional or fewer modules (or sub-modules) may be applicable to the embodiments of the systems and methods discussed. More detail of the operations, configurations and functionalities of network traffic engine 200 and each of its modules, and their role within embodiments of the present disclosure will be discussed below.

In FIG. 3, Process 300 provides non-limiting example embodiments for generating labeled training data for the disclosed ML model, as discussed herein. Usage of the training data for training the ML model is discussed with reference to Process 400 of FIG. 4, and implementation of such trained ML model is discussed with reference to Process 500 of FIG. 5, as discussed infra.

According to some embodiments, in fourth generation (4G) and fifth generation (5G) networks, the packet gateway (PGW) and user plane functions (UPFs), respectively, provide IP anchoring functionality that requires user plane traffic to flow through such network elements. In addition, the PGW/UPFs are session aware in the sense that they keep track of information, such as, for example, International Mobile Subscriber Identity (IMSI), in order to properly manage subscriber flows based on the various subscription/service/price plan information. Furthermore, PGW/UPFs each provide functionality that enables operators to capture user plane traffic and send such traffic to other systems for analysis.

Accordingly, as discussed herein, the disclosed framework, via engine 200, can execute in connection with PGW components (for 4G networks) or UPF components (for 5G networks) to perform the disclosed network traffic shaping and content delivery operations.

Turning to FIG. 3, according to some embodiments, Steps 302 and 314 of Process 300 can be performed by labelling module 202 of network traffic engine 200; and Steps 304-312 can be performed by coordinator module 204.

According to some embodiments, Process 300 begins with Step 302 where information related to a UE and an application are identified. As discussed above, the UE can be UE 102 (e.g., a smart phone of a user), and the application can be a content provider application that enables access and rendering of content (e.g., Netflix®, for example).

It should be understood that while the discussion of Process 300 of FIG. 3 will be discussed with reference to a single UE and application, it should not be construed as limiting, as the focus on a single UE and application is for purposes of clarity, as one would readily understand how the operations of the steps in Process 300 (as well as Processes 400 and 500) can be expanded to a plurality of UEs and/or applications (running on multiple UEs and/or across UEs).

According to some embodiments, such information can include, but is not limited to, UE identifier (ID) (e.g., IMSI), UE type, UE version, application ID, application type, application version, content type (e.g., offline or online content; or streaming versus downloaded), content ID, and the like.

In Step 304, engine 200 can execute an initiation application program interface (API) call based on an identifier of the UE. The API call corresponds to a request to the UPF/PGW to initiate (or create) a capture session, where the capture session corresponds to the ability to collect data/metadata related to how content is requested, processed, shaped and/or provided to the UE, as discussed herein below. For example, if the UE is 4G capable, then the API call is directed to the PGW; and if the UE is 5G capable, then the API call is directed to the UPF.

In some embodiments, such API call can include information related to the UE ID and/or application ID. The UE ID enables the content to be provided to the UE according to the account of the UE with the content provider, and the application ID enables the content to be located on the network and/or streamed and provided to the UE via the content provider. API call enables the UE to interact with content provided via the application; in other words, causes, for example, the application to execute to provide content to the UE and/or avail the UE access to content via the application. In some embodiments, some forms of API calls (e.g., for certain devices may not support certain APIs, for example) may involve "human in loop" collaboration to effectuate the API call.

In Step 306, engine 200 can collect activity data related to the UE execution of the application. The activity data can include information related to, but not limited to, a start time timestamp, end time timestamp, application ID (or name), application version, content type (offline or online), UE ID, session data stream information (e.g., packet capture (PCAP) data/metadata), and the like. For example, the collected activity data can indicate the type of user device used to stream the movie "Beverly Hills Cop" from the Netflix® application executing on such device, where such streaming began at n time and ended at m time. In another example, the collected activity data can indicate that the movie was downloaded to the device.

In some embodiments, such collected activity data can be stored in database 108. In some embodiments, such stored data can be retrieved via the PGW/UPF, as discussed infra.

In Step 308, engine 200 can execute a completion API call. In some embodiments, such completion API call can correspond to the ending of the streaming (e.g., m time) or completion of the download. In some embodiments, the completion API call can be generated or provided by the UE, user, application, engine 200, PGW/UPF and/or some combination thereof. The completion API call causes the PGW/UPF to end (or stop) capture of the activity data related to the session for which content is accessed by and/or provided to the UE via the application.

In Step 310, engine 200 can obtain session data (e.g., PCAP) related to the collected activity data, as discussed above. In some embodiments, engine 200 can execute an API call for the retrieval of the collected activity data from database 108. In some embodiments, the session data can include the information identified from the collected activity data, as discussed above.

In Step 312, engine 200 can perform data transformation of the session data. According to some embodiments, the transformation of the session data in Step 312 can involve removal of specific forms of information from the session data, which can relate to, but is not limited to, UE/application ID, UE/application name, UE IP address, and the like. In some embodiments, such removed data can be replaced with static data (e.g., non-descript data, or null data, that will not influence the subsequent labelling of the data (as in Step 314), training of the ML, discussed in relation to FIG. 4).

In some embodiments, such session data can be transformed by slicing the PCAP data into a tunable number of bits (e.g., a threshold number of bits that can be classified via an artificial intelligence (AI) and/or ML algorithm, as discussed below). In some embodiments, such session data can be transformed to different formats (e.g., video frames to image frames, for example), which can be performed via any type of known or to be known format transformation technology, including, for example, binary mapping, auto encoder, and the like.

According to some embodiments, the transformation in Step 312 can be performed via a computational analysis of the session data via a specifically trained AI/ML model, a particular machine learning model architecture, a particular machine learning model type (e.g., convolutional neural network (CNN), recurrent neural network (RNN), autoencoder, support vector machine (SVM), and the like), or any other suitable definition of a machine learning model or any suitable combination thereof.

In some embodiments, engine 200 may be configured to utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

By way of a non-limiting example, according to some embodiments, as discussed herein, engine 200 can implement an XGBoost algorithm for regression and/or classification to analyze the session data, as discussed herein. As provided herein, benefits of such algorithm can include, but are not limited to, the speed of model inference, throughput (e.g., number of model predictions generated per second), support (e.g., open-source community and support across multiple programming languages, for example), decision explainability of the feature values considered to yield a model prediction, and the like.

In some embodiments and, optionally, in combination of any embodiment described above or below, a neural network technique may be one of, without limitation, feedforward neural network, radial basis function network, recurrent neural network, convolutional network (e.g., U-net) or other suitable network. In some embodiments and, optionally, in combination of any embodiment described above or below, an implementation of Neural Network may be executed as follows:

a. define Neural Network architecture/model,
b. transfer the input data to the neural network model,
c. train the model incrementally,
d. determine the accuracy for a specific number of timesteps,
e. apply the trained model to process the newly received input data,
f. optionally and in parallel, continue to train the trained model with a predetermined periodicity.

In some embodiments and, optionally, in combination of any embodiment described above or below, the trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function may be a mathematical function that combines (e.g., sum, product, and the like) input signals to the node. In some embodiments and, optionally, in combination of any embodiment described above or below, an output of the aggregation function may be used as input to the activation function. In some embodiments and, optionally, in combination of any embodiment described above or below, the bias may be a constant value or function that may be used by the aggregation function and/or the activation function to make the node more or less likely to be activated.

Accordingly, in Step 314, based on the analysis (e.g., transformation) in Step 312, engine 200 can generate and store labeled training data. Such training data can be labeled to indicate whether the data corresponds to online (e.g., streaming) versus offline (e.g., downloaded) content. Such labeled data can be stored in database 108, as discussed above.

Figure 4:
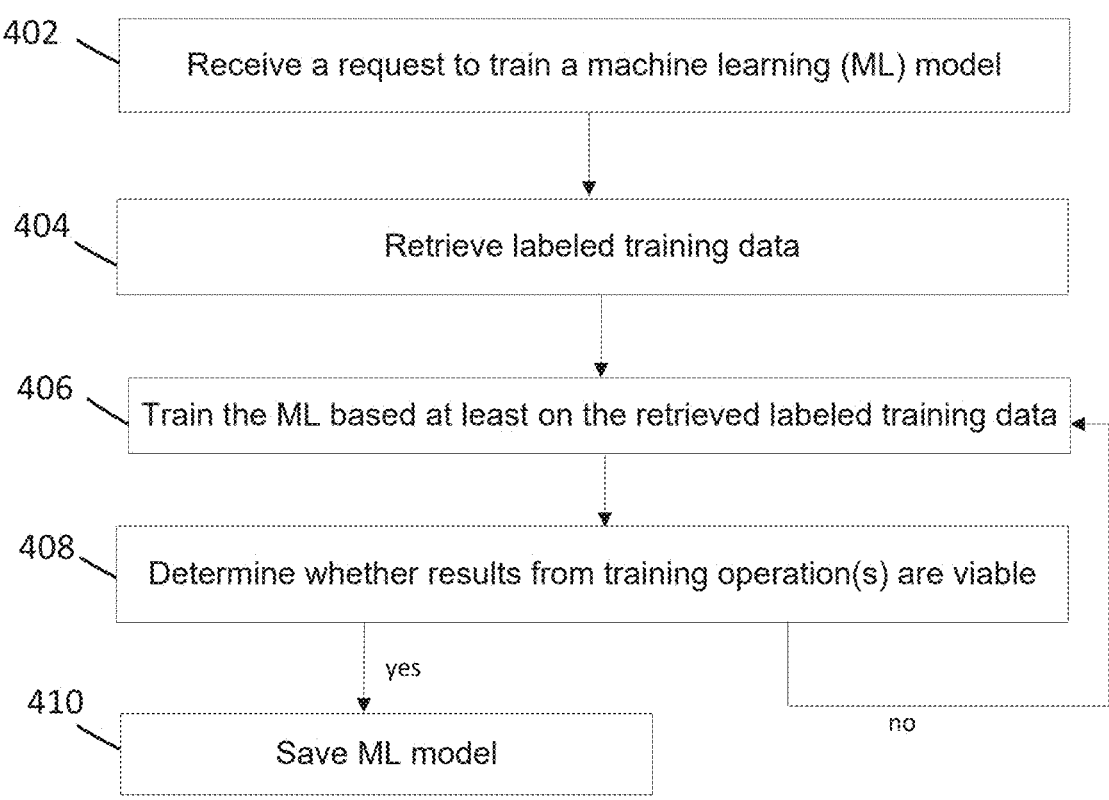
FIG. 4 illustrates an exemplary workflow according to some embodiments of the present disclosure.

Turning to FIG. 4, Process 400 provides non-limiting example embodiments for training the disclosed ML model based on the labeled training data (from Process 300 in FIG. 3), as discussed herein.

According to some embodiments, Steps 402-410 of Process 400 can be performed by training module 206 of network traffic engine 200.

According to some embodiments, Process 400 begins with Step 402 where a request to train a ML model is received. In some embodiments, the request can be provided by engine 200, PGW/UPF, a content provider, wireless carrier, a UE, an application, and the like. In some embodiments, for example, the request may correspond to training the ML for a specific application so that content can be properly shaped for the respective content provider. In another example, the request may correspond to a type of UE (e.g., smart phone), such that streaming and/or downloaded content can be properly and efficiently provided to such types of UEs.

For purposes of this discussion, the ML model will be discussed as a CNN; however, as discussed above, the instant disclosure should not be viewed as so limiting, as other forms of neural networks and/or AI/ML models can be implemented without departing from the scope of the instant disclosure.

Accordingly, a CNN is a type of deep learning model specifically designed for processing structured grid data, such as images (e.g., the transformed, labeled data from Steps 312-314 of Process 300, discussed supra). A CNN consists of multiple layers, including convolutional layers, pooling layers, and fully connected layers. The convolutional layers apply filters to the input data to extract features, capturing spatial hierarchies through local connections. Pooling layers reduce the spatial dimensions, making the model more efficient and less prone to overfitting. Fully connected layers, typically at the end of the network, integrate these features to make final predictions. CNNs are highly effective for tasks like image classification, object detection, and image segmentation due to their ability to automatically learn and optimize filters that highlight essential patterns and details in the input data. Thus, their implementation in the disclosed systems and methods naturally fits to perform the categorization of online versus offline content pursuant to the disclosed network shaping.

In Step 404, based on the request from Step 402, engine 200 can retrieve labeled training data (from database 108). In some embodiments, such retrieval may be based on an API call, as discussed above. In some embodiments, by way of non-limiting example, the labeled training data may be data labeled for a type of device and specific content provider (e.g., smart phone and Netflix® application). In another example, the labeled training data may correspond to downloaded content by a smart phone from a specific application/content provider. Thus, the identified and retrieved labeled training data can be tied to information in the request (from Step 402).

In Step 406, engine 200 can train the ML based on the retrieved labeled training data. According to some embodiments, training of the ML (CNN) model using labeled training data involves several key steps. In some embodiments, such training process can begin with the initialization of the ML model with random parameters. During training, the model processes the input data, generating predictions. These predictions are compared to the actual labels using a loss function, which quantifies the error between the predicted and true values.

In some embodiments, a pre-trained model can be utilized via known or to be known transfer learning techniques. Such operational approach can enable engine 200 to use fewer labeled examples to accomplish a similar level of accuracy. By way of a non-limiting example, if a ANN is trained on random image data, such model may learn how to spot rudimentary patterns in image data that can then be used to spot patterns in the generated dataset (from FIG. 3, supra). Accordingly, as discussed herein, the data transformation step (e.g., Step 312) can configure such data into a respective N×N matrix the pre-trained ANN ML expects and an input.

The ML model can then employ an optimization technique, for example gradient descent, to adjust the model's parameters in a way that minimizes the loss (to a threshold value). In some embodiments, such processing can iterate over many time periods, with each time period including at least one of a forward pass (making predictions and calculating loss) and a backward pass (updating parameters). The model's performance can be periodically evaluated on the validation set to monitor its ability to generalize to new, unseen data.

Thus, in Step 408, engine 200 can determine if the results (or output) of the ML model satisfy a threshold value of accuracy and/or efficiency); and if so, the model is stored in Step 410, which can be stored in a manner with a version number (or other identifying information of the model to indicate its usage (e.g., use with x application and/or y device type, for example); and if not, processing can recursively proceed back to Step 406 for further training.

In some embodiments, such thresholds provide requirements that enable the ML model to be viable (or useful) within a live, run-time environment. For example, a total time to analyze the content stream must be performed in less than k time (e.g., 2000 ms, for example). In some embodiments, such requirements may further be based on the UE executing such ML not having special hardware (e.g., GPUs).

Accordingly, in some embodiments, as training progresses, the model's parameters can be fine-tuned to reduce the loss, resulting in improved accuracy and performance. Once the ML model achieves satisfactory performance on the validation set (e.g., at the threshold value of accuracy and/or efficiency for example), training is complete. The trained ML model can then be stored in database 108. And, as discussed in relation to Process 500 of FIG. 5, the ML model can be deployed to perform categorizations of content pursuant to traffic shaping operations of accessed and/or provided content, as discussed below.

Figure 5:
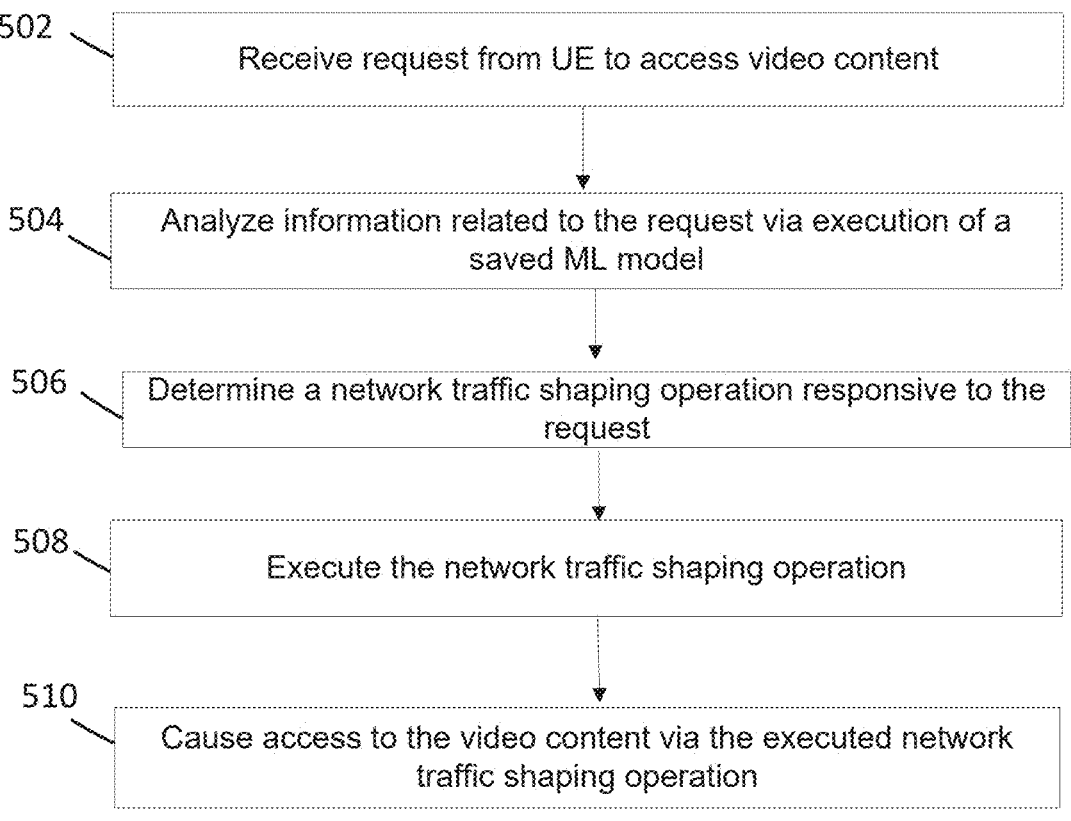
FIG. 5 illustrates an exemplary workflow according to some embodiments of the present disclosure.

Turning to FIG. 5, Process 500 provides non-limiting example embodiments for implementing the disclosed network traffic shaping mechanisms via the trained and stored ML model, as discussed herein.

According to some embodiments, Steps 502-510 of Process 500 can be performed by output module 208 of network traffic engine 200.

According to some embodiments, Process 500 begins with Step 502 where a request from a UE is received to access video content. For example, the UE, a user's smart phone, may request, via the Netflix® application, access to the movie "Beverly Hills Cop"®. As discussed above, such request may correspond to downloading the movie to their device or streaming the movie.

According to some embodiments, such request can include information related to, but not limited to, UE ID, UE type, UE version, application ID, application type, application version, content type, content ID, and the like.

In Step 504, engine 200 can identify a proper ML model (e.g., select the ML model from a set of saved ML models), which can be based on the request information (e.g., UE ID and/or application ID), and perform an analysis of the request (and the information related thereto). For example, a specifically trained and stored ML model (e.g., via Process 400 of FIG. 4, discussed above) for the Netflix® application executing on a smart phone (e.g., iPhone®) can be retrieved and executed.

In some embodiments, all models (e.g., that correspond to an application or set of applications and/or application types, for example) can be executed in parallel, where the ML model with the output at the highest classification confidence (and/or output) can be selected. For example, for models trained for Netflix, Amazon Prime and Hulu, for a given stream, engine 200 can run the data through all the models, and the one which has the highest confidence can be selected. For example, in some embodiments, each model can have 3 possible outputs, 1. Online Streaming, 2. Offline streaming, 3. Unknown, whereby the confidence and selection can be based therefrom.

In Step 506, based on such execution of the ML model, engine 200 can determine a network traffic shaping operation responsive to the request. For example, if the request involves downloading content, then engine 200 can determine the respective PGW/UPF operations for such download request.

In Step 508, the determined traffic shaping operation (from Step 506) can be executed, where in Step 510, the access or providing of content to the UE can be effectuated. By way of example, using the above example, if the smart phone is requesting to download the movie, and the UE is a 5G device, then the UPF can operate to facilitate such download (which can be determined and/or operated within the threshold efficiency constraints, as discussed above).

According to some embodiments, engine 200 can perform "spot checks" on the deployed ML model. For example, upon performing Step 510 (or upon selecting the model in Step 504, for example), engine 200 can execute validation operations to perform a computational analysis of the ML model (in a similar manner as discussed above at least in reference to Step 408's viability determination). Such analysis can cause further performance and classification operations respective to the ML model to ensure it is operating at threshold satisfying levels, as discussed above. Accordingly, in some embodiments, such validation can involve a work order being generated, for which a selected application can be analyzed respective to the ML model to determine the performance of the model for guiding how the content can be provided via the application, as discussed herein.

Accordingly, as discussed herein, network traffic shaping operations can be modified and employed to optimize the handling of streaming and downloaded video. Such processing can involve, but is not limited to, the regulation of data transfer rates, ensuring a consistent and smooth delivery of video content to users. In some embodiments, an operation can be tied to bandwidth allocation, where engine 200 (e.g., via the PGW/UPF) can prioritize video traffic over less critical data streams, such as file downloads or background updates. Such prioritization helps to reduce buffering and maintain high video quality, especially during peak usage times. Additionally, traffic shaping can include packet scheduling, where video packets are given higher priority and are sent first, reducing latency and improving playback performance. Rate limiting is another technique, where the maximum bandwidth available for video streaming is controlled to prevent network congestion. By implementing such operations, network traffic shaping ensures a more efficient and user-friendly experience for streaming and downloaded videos, providing a balanced and optimized use of network resources.

And, in Step 508, based on the executed traffic shaping operation(s), the content can be provided to the UE in a manner that is responsive to the request (e.g., streamed or downloaded).

Accordingly, in some embodiments, information related to such determinations and processing in Process 500 can be provided as in to Step 406 for further training of the ML model.

Thus, as provide above via the processing in Processes 300-500, the disclosed framework can execute a trained ML algorithm that analyzes real-time network conditions and content characteristics, and the like, to make such determinations as to how to deliver content to users, for which content is then provided to requesting content provider applications executing on user devices.

Figure 6:
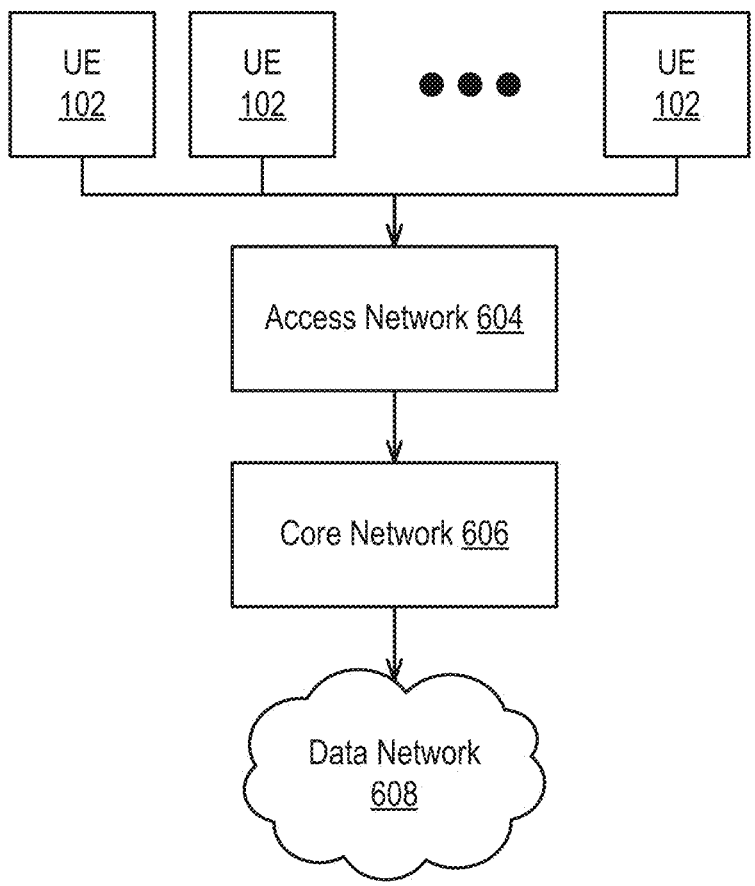
FIG. 6 illustrates a non-limiting example embodiment of a network architecture according to some embodiments of the present disclosure.

FIG. 6 is a block diagram of an example network architecture according to some embodiments of the present disclosure. In the illustrated embodiment, UE 102 accesses a data network 608 via an access network 604 and a core network 606.

In the illustrated embodiment, the access network 604 comprises a network allowing network communication with UE 102. In general, the access network 604 includes at least one base station that is communicatively coupled to the core network 606 and coupled to zero or more UE 102.

In some embodiments, the access network 604 comprises a cellular access network, for example, a 5G network. In an embodiment, the access network 604 can include a NextGen Radio Access Network (NG-RAN). In an embodiment, the access network 604 includes a plurality of next Generation Node B (e.g., eNodeB and gNodeB) base stations connected to UE 102 via an air interface. In one embodiment, the air interface comprises a New Radio (NR) air interface. For example, in a 5G network, individual user devices can be communicatively coupled via an X2 interface.

In the illustrated embodiment, the access network 604 provides access to a core network 606 to UE 102. In the illustrated embodiment, the core network may be owned and/or operated by a network operator (NO) and provides wireless connectivity to UE 102. In the illustrated embodiment, this connectivity may comprise voice and data services.

At a high-level, the core network 606 may include a user plane and a control plane. In one embodiment, the control plane comprises network elements and communications interfaces to allow for the management of user connections and sessions. By contrast, the user plane may comprise network elements and communications interfaces to transmit user data from UE 102 to elements of the core network 606 and to external network-attached elements in a data network 608 such as the Internet.

In the illustrated embodiment, the access network 604 and the core network 606 are operated by a NO. However, in some embodiments, the networks (604, 606) may be operated by a private entity and may be closed to public traffic. For example, the components of the network 606 may be provided as a single device, and the access network 604 may comprise a small form-factor base station. In these embodiments, the operator of the device can simulate a cellular network, and UE 102 can connect to this network similar to connecting to a national or regional network.

In some embodiments, the access network 604, core network 606 and data network 608 can be configured as a MEC network, where MEC or edge nodes are embodied as each UE 102 and are situated at the edge of a cellular network, for example, in a cellular base station or equivalent location. In general, the MEC or edge nodes may comprise UEs that comprise any computing device capable of responding to network requests from another UE 102 (referred to generally for example as a client) and is not intended to be limited to a specific hardware or software configuration of a device.

Figure 7:
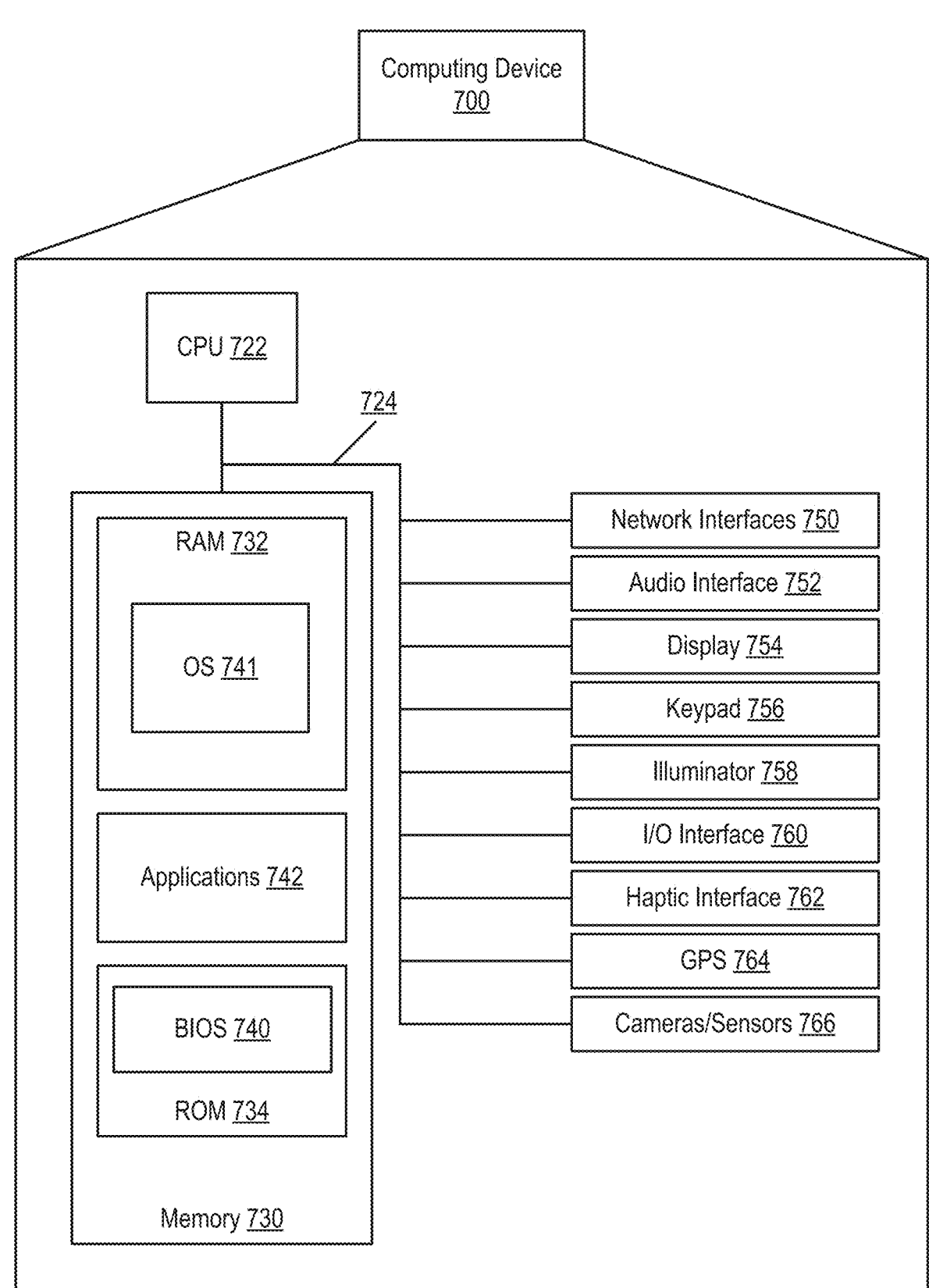
FIG. 7 is a block diagram illustrating a computing device showing an example of a client or server device used in various embodiments of the present disclosure.

FIG. 7 is a block diagram illustrating a computing device showing an example of a client or server device used in the various embodiments of the disclosure.

The computing device 700 may include more or fewer components than those shown in FIG. 7, depending on the deployment or usage of the device 700. For example, a server computing device, such as a rack-mounted server, may not include audio interfaces 752, displays 754, keypads 756, illuminators 758, haptic interfaces 762, GPS receivers 764, or cameras/sensors 766. Some devices may include additional components not shown, such as graphics processing unit (GPU) devices, cryptographic co-processors, artificial intelligence (AI) accelerators, or other peripheral devices.

As shown in FIG. 7, the device 700 includes a CPU 722 in communication with a mass memory 730 via a bus 724. The computing device 700 also includes one or more network interfaces 750, an audio interface 752, a display 754, a keypad 756, an illuminator 758, an input/output interface 760, a haptic interface 762, an optional global positioning systems (GPS) receiver 764 and a camera(s) or other optical, thermal, or electromagnetic sensors 766. Device 700 can include one camera/sensor 766 or a plurality of cameras/sensors 766. The positioning of the camera(s)/sensor(s) 766 on the device 700 can change per device 700 model, per device 700 capabilities, and the like, or some combination thereof.

In some embodiments, the CPU 722 may comprise a general-purpose CPU. The CPU 722 may comprise a single-core or multiple-core CPU. The CPU 722 may comprise a system-on-a-chip (SoC) or a similar embedded system. In some embodiments, a GPU may be used in place of, or in combination with, a CPU 722. Mass memory 730 may comprise a dynamic random-access memory (DRAM) device, a static random-access memory device (SRAM), or a Flash (e.g., NAND Flash) memory device. In some embodiments, mass memory 730 may comprise a combination of such memory types. In one embodiment, the bus 724 may comprise a Peripheral Component Interconnect Express (PCIe) bus. In some embodiments, the bus 724 may comprise multiple busses instead of a single bus.

Mass memory 730 illustrates another example of computer storage media for the storage of information such as computer-readable instructions, data structures, program modules, or other data. Mass memory 730 stores a basic input/output system ("BIOS") 740 for controlling the low-level operation of the computing device 700. The mass memory also stores an operating system 741 for controlling the operation of the computing device 700.

Applications 742 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 732 by CPU 722. CPU 722 may then read the software or data from RAM 732, process them, and store them to ROM 734.

The computing device 700 may optionally communicate with a base station (not shown) or directly with another computing device. Network interface 750 is sometimes known as a transceiver, transceiving device, or network interface card (NIC).

The audio interface 752 produces and receives audio signals such as the sound of a human voice. For example, the audio interface 752 may be coupled to a speaker and microphone (not shown) to enable telecommunication with others or generate an audio acknowledgment for some action. Display 754 may be a liquid crystal display (LCD), gas plasma, light-emitting diode (LED), or any other type of display used with a computing device. Display 754 may also include a touch-sensitive screen arranged to receive input from an object such as a stylus or a digit from a human hand.

Keypad 756 may comprise any input device arranged to receive input from a user. Illuminator 758 may provide a status indication or provide light.

The computing device 700 also comprises an input/output interface 760 for communicating with external devices, using communication technologies, such as USB, infrared, Bluetooth™, or the like. The haptic interface 762 provides tactile feedback to a user of the client device.

The optional GPS transceiver 764 can determine the physical coordinates of the computing device 700 on the surface of the Earth, which typically outputs a location as latitude and longitude values. GPS transceiver 764 can also employ other geo-positioning mechanisms, including, but not limited to, triangulation, assisted GPS (AGPS), E-OTD, CI, SAI, ETA, BSS, or the like, to further determine the physical location of the computing device 700 on the surface of the Earth. In one embodiment, however, the computing device 700 may communicate through other components, providing other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

To the extent the aforementioned implementations collect, store, or employ personal information of individuals, groups, or other entities, it should be understood that such information shall be used in accordance with all applicable laws concerning the protection of personal information. Additionally, the collection, storage, and use of such information can be subject to the consent of the individual to such activity, for example, through well known "opt-in" or "opt-out" processes as can be appropriate for the situation and type of information. Storage and use of personal information can be in an appropriately secure manner reflective of the type of information, for example, through various access control, encryption, and anonymization techniques (for especially sensitive information).

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

What is claimed is:

1. A method comprising:

receiving a request for a user device to access content over a network, the content accessible via an application associated with the user device;

analyzing the request, and selecting a machine learning (ML) model from a set of ML models, the ML model being a trained ML model for handling requests related to at least a type of the application, the ML model being trained using a set of operations, the set of operations comprising:

collecting, over a time period, session data for a set of devices executing the application, analyzing the session data to determine a labeled training data set, the labeled training data set comprising information related to online and offline content, and training the ML model based on the labeled training data set, the training being performed in accordance with at least an efficiency threshold that corresponds to a speed at which the ML model can be executed at runtime;

executing the ML model, the execution causing a network traffic shaping operation to be executed that corresponds to a type of the request; and providing, via the network traffic shaping operation, the user device access to the content in response to the request.

2. The method of claim 1, further comprising the request type being an online request or offline request, the online request comprising the request corresponding to streaming of the content by the user device, the offline request comprising the request corresponding to a download of the content by the user device.

3. The method of claim 1, further comprising:

performing the network traffic shaping operation by modifying network traffic associated with the provided access to the content to correspond to the type of the request.

4. The method of claim 1, further comprising the session data comprising information related to at least one of a user device identifier (ID), user device type, user device version, application ID, application type, application version, content type and content ID.

5. The method of claim 1, further comprising:

identifying network capabilities related to the user device;

identifying a network component specific to the network capabilities; and performing the network traffic shaping operation via the network component.

6. The method of claim 5, further comprising the network capabilities relating to at least one of a fourth generation (4G) network and a fifth generation (5G) network, wherein the network component is a packet gateway (PGW) or user plane function (UPF).

7. The method of claim 1, further comprising:

further training the ML model based on the access provided to the user device.

8. The method of claim 1, further comprising the ML model being a convolutional neural network (CNN).

9. A system comprising:

a processor configured to:

receive a request for a user device to access content over a network, the content accessible via an application associated with the user device;

analyze the request, and select a machine learning (ML) model from a set of ML models, the ML model being a trained ML model for handling requests related to at least a type of the application, the processor being configured to train the ML model using a set of operations, the set of operations comprising:

collecting, over a time period, session data for a set of devices executing the application, analyzing the session data to determine a labeled training data set, the labeled training data set comprising information related to online and offline content, and training the ML model based on the labeled training data set, the training being performed in accordance with at least an efficiency threshold that corresponds to a speed at which the ML model can be executed at runtime;

execute the ML model, the execution causing a network traffic shaping operation to be executed that corresponds to a type of the request; and provide, via the network traffic shaping operation, the user device access to the content in response to the request.

10. The system of claim 9, wherein the processor is further configured such that the request type is an online request or offline request, the online request comprising the request corresponding to streaming of the content by the user device, the offline request comprising the request corresponding to a download of the content by the user device.

11. The system of claim 9, wherein the processor is further configured to:

perform the network traffic shaping operation by modifying network traffic associated with the provided access to the content to correspond to the type of the request.

12. The system of claim 9, wherein the processor is further configured such that the session data comprises information related to at least one of a user device identifier (ID), user device type, user device version, application ID, application type, application version, content type and content ID.

13. The system of claim 9, wherein the processor is further configured to:

identify network capabilities related to the user device;

identify a network component specific to the network capabilities; and perform the network traffic shaping operation via the network component.

14. The system of claim 13, wherein the processor is further configured such that the network capabilities relate to at least one of a fourth generation (4G) network and a fifth generation (5G) network, wherein the network component is a packet gateway (PGW) or user plane function (UPF).

15. A non-transitory computer-readable storage medium tangibly encoded with computer-executable instructions, that when executed by a processor, perform a method comprising:

receiving a request for a user device to access content over a network, the content accessible via an application associated with the user device;

analyzing the request, and selecting a machine learning (ML) model from a set of ML models, the ML model being a trained ML model for handling requests related to at least a type of the application, the ML model being trained using a set of operations, the set of operations comprising:

collecting, over a time period, session data for a set of devices executing the application, analyzing the session data to determine a labeled training data set, the labeled training data set comprising information related to online and offline content, and training the ML model based on the labeled training data set, the training being performed in accordance with at least an efficiency threshold that corresponds to a speed at which the ML model can be executed at runtime;

executing the ML model, the execution causing a network traffic shaping operation to be executed that corresponds to a type of the request; and providing, via the network traffic shaping operation, the user device access to the content in response to the request.

16. The non-transitory computer-readable storage medium of claim 15, further comprising the request type being an online request or offline request, the online request comprising the request corresponding to streaming of the content by the user device, the offline request comprising the request corresponding to a download of the content by the user device.

* * * * *